Sept. 29, 1964  R. C. RIKE  3,150,493
BRAKE BOOSTER WITH ATMOSPHERE CIRCULATION THROUGH MECHANISM
Filed June 22, 1962  2 Sheets-Sheet 2

Fig.2

INVENTOR.
RICHARD C. RIKE
BY D. D. McGraw
ATTORNEY

United States Patent Office 3,150,493
Patented Sept. 29, 1964

3,150,493
BRAKE BOOSTER WITH ATMOSPHERE CIRCULATION THROUGH MECHANISM
Richard C. Rike, Dayton, Ohio, assignor to General Motors Corporation, Detroit, Mich., a corporation of Delaware
Filed June 22, 1962, Ser. No. 204,349
8 Claims. (Cl. 60—54.6)

This invention relates to brake booster mechanisms and particularly to power assist mechanisms for aiding in the manual application of brakes on a vehicle.

In some arrangements of power assist mechanisms for brake boosters, it is desirable to use a more or less conventional master cylinder and piston arrangement wherein a plunger member extends into the master piston to move it forward into the master cylinder to effect displacement of hydraulic fluid from the master cylinder. In such arrangements, when applied to the wall of a brake booster or power assist mechanism a fluid seal is required between the rod which drives the master piston and the wall of the power assist mechanism on which a master cylinder is mounted. The arrangement produces a cavity in the master cylinder between the rearward end of the master piston and the seal that engages the plunger rod and actuates the master piston so that reciprocation of the master piston in the master cylinder produces a breathing or pumping action in the chamber between the rearward end of the master piston and the aforementioned seal member. This requires that the chamber be vented to atmosphere since there is considerable displacement of air in the chamber during reciprocation of the master piston in the cylinder.

It has been expedient to vent the aforementioned chamber to the atmosphere at the master cylinder, but with the brake booster unit or power assist unit being placed in the engine compartment of a vehicle, the breathing action into and out of the chamber in the master cylinder heretofore mentioned has been to and from the engine compartment of the vehicle which is susceptible to various kinds of dirt and fumes which erode the master cylinder wall in the aforementioned chamber and produce other deleterious effects.

It is an object of this invention to provide brake booster or power assist mechanism wherein the atmosphere breathed or pumped into and from the chamber in the master cylinder between the rearward end of the master piston and the seal that engages the actuating rod, or the guide member for the same, is obtained from the passenger compartment of the vehicle so that the cleanest possible layer is circulated through the aforementioned chamber in a unidirectional manner, always from the passenger compartment of the vehicle, thereby avoiding as much as possible dirt and fumes that would have a deleterious effect on the wall and piston of the master cylinder and the rubber members that form seals at this end of the master cylinder.

Further objects and advantages of the present invention will be apparent from the following description, reference being had to the accompanying drawings wherein preferred embodiments of the present invention are clearly shown.

In the drawings:

FIGURE 2 is a transverse cross-sectional view similar to FIGURE 1 but with the power wall of the power assist mechanism or brake booster in its forward power applied position; and FIGURE 3 is a cross-sectional view taken along line 3—3 of FIGURE 1.

Figure 1:
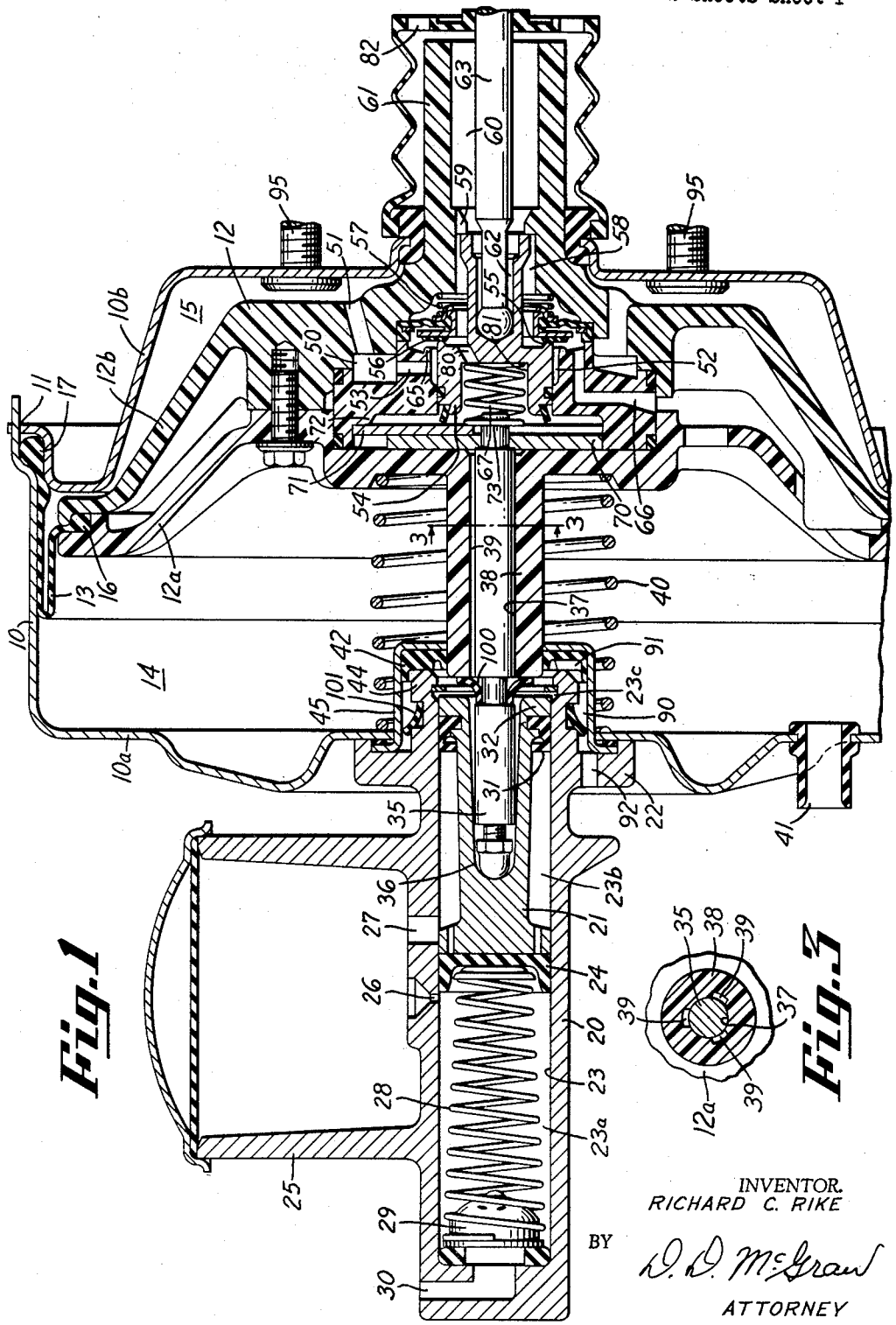
FIGURE 1 is a transverse cross-sectional view of a power assist mechanism or brake booster incorporating features of this invention.

In this invention a brake booster or power assist mechanism consists of a casing 10 comprised of the casing part 10a and the casing part 10b secured together by a bayonet lock arrangement 11. A movable power wall 12 is disposed within the casing and cooperates with a rolling diaphragm 13 to form the chambers 14 and 15 at opposite sides of the power wall. The rolling diaphragm 13 has its inner annular periphery 16 secured to the power wall by being clamped between the wall sections 12a and 12b. The outer edge periphery 17 of the rolling diaphragm 13 is clamped between the casing parts 10a and 10b and forms a seal therewith.

A master cylinder 20 having a master piston 21 reciprocable therein is attached to the wall part 10a of the casing 10 by a radial flange 22 bolted to the wall 10a by bolts that are not shown. The master piston 21 operates within the cylinder bore 23 that has a cup seal 24 carried on the forward wall of the piston 21 to divide the cylinder bore into the forward chamber 23a and the rear chamber 23b.

The forward chamber 23a of the master cylinder is in fluid connection with the reservoir 25 by means of a fill port 26 and the port 27 communicates with the chamber 23b. A compression spring 28 retained between the cup seal 24 and the residual pressure check valve 29 urges the piston 21 to the position shown in FIGURE 1 on brake retraction. The residual pressure check valve 29 retains a minimum value pressure in the outlet 30 from the master cylinder chamber 23a to prevent air from entering the brake lines in a manner well known in the art.

The master piston 21 has an annular seal 31 at its rearward end 32 which separates the chamber 23b from a third chamber 23c which is enlarged as the piston 21 moves from the position shown in FIGURE 1 to the position shown in FIGURE 2.

The master piston 21 is moved in a forward direction by a plunger rod 35 that extends into the recess 36 in the master piston, plunger rod 35 being supported within an axial bore 37 provided in the forwardly extending projection 38 that is a part of the movable wall 12 of the fluid motor or power assist mechanism. The bore 37 in the projetcion 38 has one or more axially extending recesses 39 for passage of air in a manner hereinafter described.

The movable power wall 12 of the fluid motor is urged to the retracted position shown in FIGURE 1 by the compression spring 40. The wall part 10a of the casing 10 has a port 41 that is connected with the manifold of an engine for supply of vacuum to the chamber 14.

The forward extension 38 of the power wall 12 reciprocates within a rubber-like seal member 42 that engages the outer periphery of the cylindrical forward extension 38 and is retained in sealing engagement with the end wall 44 of the master cylinder piston by means of a cage 45 so as to prevent fluid connection between the chamber 23c in the master cylinder and the chamber 14 in the power unit.

The power wall 12 has a chamber 50 that communicates with the chamber 15 by means of a port 51, chamber 50 also communicating with an axial chamber bore 52 by means of a port 53. The chamber bore 52 carries an axially movable valve member 54 that has an air valve seat 55 engaging a valve element 56, valve element 56 being urged against the air valve seat 55 by compression spring 57 so as to close communication between the chamber bore 52 and the axial chamber bore 58 which is connected with atmosphere through the port 59 in the bore 60 in the extension 61 provided outwardly from the right-hand side of the power wall 12.

The valve member 54 has an axial bore 62 that receives the end of a plunger rod 63 that is operated manually by connection with the brake pedal of a motor vehicle.

An annular vacuum valve seat 65 is positioned coaxially around the air valve seat 55 and as shown in FIGURE 1 is disengaged from the valve element 56 so that the chamber bore 52 communicates with the chamber 14 through the port 66 whereby chamber 14 can communicate with chamber 15 through port 53, chamber 50 and port 51. The power assist unit is therefore of the character known as a vacuum suspended unit, vacuum being on both sides of the power wall 12 when the power assist is in the retracted position shown in FIGURE 1. A valve element 54 is urged in the position shown in FIGURE 1 by the compression spring 67.

A brake feel reaction system is provided between the actuating plunger 35 and the valve member 54 thereby in connection with the manually operated rod 63 through means of a reaction disc 70 carried on the rod 35 and a plurality of reaction finger members 71 that extend between the reaction finger seat structure 72 and the inner end 73 of the spring 67. When the power assist unit moves from the position shown in FIGURE 1 to the position shown in FIGURE 2, the reaction spring fingers 71 operate against the valve member 54 so as to effect brake feel back through the plunger rod 63 in a manner well known in the art and as more particularly disclosed and described in the patent to Richard C. Rike, 2,826,041, dated March 11, 1958.

The valve member 54 has an air port 80 that communicates with the spring cage bore 81 so that atmosphere air can pass through the port 82 into the axial chamber 60 and thence into the axial bore 58 and through passage 80 into the spring bore chamber 81 from which the air will pass through the reaction elements into the axially extending recesses 39 in the bore 37 for communication with the chamber 23c at the rearward end of the master piston 21.

The chamber 23c of the master cylinder is in communication with a chamber 90 in the cage 45 through radially arranged ports 91 in the seal member 42 so that atmosphere air can pass outwardly through the passage 90 of chamber 91 into the port 92 and thence into the atmosphere area adjacent the chamber wall 10a. Thus it will be seen that atmosphere from the area adjacent the port 82 can pass through the valve structure and the power assist unit for delivery to the atmosphere area adjacent the wall part 10a of casing 10. With the wall part 10b of casing 10 being secured to the power wall of the passenger compartment by means of the studs 95 and suitable bolts, it will be understood that the atmosphere area adjacent port 82 is that within the passenger compartment of the vehicle so that air from the passenger compartment of the vehicle will pass through the power assist unit in the manner heretofore mentioned.

When the master piston 21 moves forward into the master cylinder and the forward extension 38 on the movable wall 12 moves from the position shown in FIGURE 1 to the position shown in FIGURE 2 and retracts therefrom during power operation of the wall 12, it will be appreciated that there will be a breathing or pumping action created in the chamber 23c. To insure the atmosphere air from the area within the passenger compartment passing through the power unit through the passages heretofore mentioned, there is provided on the rod 35 a valve member 100 that has the outer edge periphery flexible to open passages 39 when the piston 21 and the forward extension 38 move from the position shown in FIGURE 2 to the position shown in FIGURE 1. This action draws air from the passenger compartment of the vehicle through the port 82, bore 60 and bore 58 and thence through passage 80 and spring bore 81 and through passages 39 into the chamber 23c.

When the piston 21 and the forward projection 38 on the movable wall 12 move from the position shown in FIGURE 1 to the position shown in FIGURE 2, the air that has previously been drawn into the chamber 23 will be expelled from this chamber to a second valve 101 through passage 91, chamber 90 under control of valve 101 into port 92. Thus the valves 100 and 101 control the flow of air from the passenger compartment of the vehicle to the atmosphere adjacent the wall 10a of the casing 10 in a unidirectional manner so that only air from the passenger compartment can enter the chamber 23c and thereby keep this chamber filled with the cleanest possible air.

While the embodiments of the present invention as herein disclosed constitute preferred forms, it is to be understood that other forms might be adopted.

What is claimed is as follows:

1. In a brake booster mechanism comprising, a fluid operated motor having a casing provided with a movable wall therein actuated by a pressure differential on opposite sides of the wall, a master cylinder having a piston reciprocable therein, said master cylinder being carried on a wall of said casing, a projection on said movable wall reciprocable in said cylinder on movement of said wall, a follow-up valve mechanism having a position to establish equivalent pressures at opposite sides of said movable wall to inactivate the motor and another position to establish differential pressures at opposite sides of the movable wall to activate the motor; the improvement comprising, air passage means through said movable wall and said projection fluid connecting a first atmosphere area outside the said casing at one wall thereof and a second atmosphere area outside said casing at the opposite wall that supports said master cylinder, and valve means providing for atmosphere air flow through said passage means from said first atmosphere area to said second atmosphere area on reciprocation of said projection in said cylinder.

2. In a brake booster mechanism comprising, a fluid operated motor having a casing provided with a movable wall therein actuated by a pressure differential on opposite sides of the wall, a master cylinder having a piston reciprocable therein, said master cylinder being carried on a wall of said casing, a projection on said movable wall of smaller diameter than said cylinder providing thereby a clearance space therebetween and effecting a bumping action on reciprocation of the projection in said cylinder on movement of said wall, a follow-up valve mechanism having a position to establish equivalent pressures at opposite sides of said movable wall to inactivate the motor and another position to establish differential pressures at opposite sides of the movable wall to activate the motor; the improvement comprising, air passage means through said movable wall and said projection fluid connecting a first atmosphere area outside the said casing at one wall thereof and a second atmosphere area outside said casing at the opposite wall that supports said master cylinder, and valve means providing for unidirectional atmosphere air flow through said passage means from said first atmosphere area to said second atmosphere area upon reciprocation of said projection in said cylinder.

3. The brake booster mechanism improvement constructed and arranged in accordance with claim 2 wherein said follow-up valve mechanism is contained within said movable wall and said air passage means also extends through said follow-up valve mechanism.

4. In a brake booster mechanism comprising, a fluid operated motor having a casing provided with a movable wall therein actuated by a pressure differential on opposite sides of the wall, a master cylinder having a piston reciprocable therein, said master cylinder being carried on a wall of said casing, a projection on said movable wall of smaller diameter than said cylinder providing thereby a clearance space therebetween and effecting a bumping action on reciprocation of the projection in said cylinder on movement of said wall, a follow-up valve mechanism having a position to establish equivalent pressures at opposite sides of said movable wall to inactivate the motor and another position to establish differential pressures at opposite sides of the movable wall to activate the motor; the improvement comprising air passage means through said movable wall and said projection fluid connecting a first atmosphere area outside the said casing at one wall thereof and a second atmosphere area outside said casing at the opposite wall that supports said master cylinder, first valve means controlling unidirectional air flow through said passage means from said first atmosphere area to said clearance space, and second valve means controlling unidirectional air flow from said clearance space to said second atmosphere area.

5. The brake booster mechanism improvement constructed and arranged in accordance with claim 4 wherein said follow-up valve mechanism is carried in said movable wall and said air passage extends through said follow-up valve mechanism in fluid connecting said first atmosphere area with said second atmosphere area.

6. In a brake booster mechanism comprising, a fluid operated motor having a casing provided with a movable wall therein actuated by presure differential on opposite sides of the wall, a master cylinder having a piston reciprocable therein, said master cylinder being carried on a wall of said casing, a projection on said movable wall of smaller diameter than said cylinder providing thereby a clearance space therebetween and effecting a pumping action on reciprocation of said projection in said cylinder on movement of said wall, a follow-up valve mechanism including concentrically arranged inner and outer valve members having a position to establish equivalent pressures at oposite sides of said movable wall to inactivate the motor and another position to establish differential pressures at opposite sides of the movable wall to activate the motor; the improvement comprising, air passage means extending axially through said movable wall radially inward of the inner of said valve members and through said projection establishing thereby fluid connection between a first atmosphere area outside the said casing at one wall thereof and a second atmosphere area outside said casing at the opposite wall that supports said master cylinder, first valve means controlling unidirectional air flow through said passage means from said first atmosphere area to said clearance space, and second valve means controlling unidirectional air flow from said clearance space to said second atmosphere area on reciprocation of said projection in said cylinder.

7. The brake booster mechanism improvement constructed and arranged in accordance with claim 6 wherein said projection extends through a seal member at one end of said cylinder with said clearance space being provided between said projection and said cylinder forward of said seal member, said seal member separating the said clearance space from a chamber space at one side of said movable wall.

8. The brake booster mechanism improvement constructed and arranged in accordance with claim 7 wherein said first valve means is disposed adjacent an end of said projection and within said cylinder and said second valve means is positioned on said cylinder in a chamber space provided between said cylinder and the wall of said casing that supports said cylinder.

References Cited in the file of this patent
UNITED STATES PATENTS

| | | |
|---|---|---|
| 2,842,101 | Price | July 8, 1958 |
| 2,878,646 | Edge et al. | Mar. 24, 1959 |
| 3,013,535 | Schultz | Dec. 19, 1961 |